United States Patent [19]
Sugiyama et al.

[11] 3,931,863
[45] Jan. 13, 1976

[54] NOISE REDUCTION DEVICE FOR AUTOMOTIVE VEHICLES

[75] Inventors: Yukio Sugiyama; Tsuyoshi Sumi, both of Toyota, Japan

[73] Assignee: Toyota Jidosha Kogyo Kabushiki Kaisha, Japan

[22] Filed: Aug. 1, 1974

[21] Appl. No.: 493,845

[30] Foreign Application Priority Data
Dec. 3, 1973  Japan.............................. 48-134269

[52] U.S. Cl................... 180/71; 74/590; 280/124 B
[51] Int. Cl.²......................................... B60K 23/04
[58] Field of Search.... 180/71, 73 R, 73 TL, 73 TT, 180/70 P; 74/590; 280/124 B

[56] References Cited
UNITED STATES PATENTS

| | | | |
|---|---|---|---|
| 2,207,465 | 7/1940 | Leighton | 180/71 X |
| 2,904,578 | 10/1959 | Taber | 180/73 R X |
| 3,497,028 | 2/1970 | Sampietro | 180/71 |
| 3,504,573 | 4/1970 | Yoshida | 180/70 P |

*Primary Examiner*—Leo Friaglia
*Assistant Examiner*—John P. Silverstrim
*Attorney, Agent, or Firm*—Toren, McGeady and Stanger

[57] ABSTRACT

Noise reduction is achieved at the rear axle of an automotive vehicle by mounting a weight at the point on the rear axle housing at which a lateral control rod of the vehicle is connected. The lateral control rod extends between the body-frame attachment and a pin at which one end of the control rod is connected and the weight to reduce noise is mounted in the vicinity of the pin.

5 Claims, 7 Drawing Figures

NOISE REDUCTION DEVICE FOR AUTOMOTIVE VEHICLES

BACKGROUND OF THE INVENTION

The present invention relates generally to noise reduction devices for automotive vehicles and more particularly to a mechanism which may be utilized at the rear axle of the vehicle to reduce unpleasant noise which may occur in the vehicle passenger compartment. More specifically, the invention is directed to reducing or eliminating axle noise in a vehicle of the 4-link rear suspension type.

In vehicles of this type, the vibrations excited by the rear axle pinion and ring gears during operation of the vehicle are amplified by resonance occurring in such parts as the driveline or the rear axle housing of the vehicle. These vibrations is then transferred to the body-frame by such parts as the lower control arm, the upper control arm or the lateral control arm, thereby generating a disagreeable noise within the passenger compartment of the vehicle.

In order to reduce such noise, several methods have been proposed. An example of one such method involves changing the resonance point of the driveline of the vehicle or of the axle housing or other similar parts. Other proposals have included reducing the vibration level at the resonance point of the rear axle housing by a dynamic damper. However, it has been found that all such proposals do not sufficiently satisfy the noise reduction requirements.

The present invention is aimed toward providing a more effective means for reducing axle noise in the vehicle compartment.

SUMMARY OF THE INVENTION

Briefly, the present invention may be described as an axle noise reduction device for an automotive vehicle having a rear axle housing with a differential carrier, a mounting pin extending from said housing and a lateral control rod connected between the body-frame attachment and the pin. More specifically, the present invention involves the improvement wherein said noise reduction device comprises a weight fixedly mounted at the connection point between the lateral control rod and the pin.

The weight to reduce axle noise may be several hundred grams and, preferably, between about 120–200 grams and it may be attached to the pin in several different ways. For example, where the lateral control rod is attached to the pin by means of a nut, the weight may be welded directly upon a nut. In a case where the connection means include a nut and a rubber bushing, the weight may be mounted between the nut and the rubber bushing. Alternatively, the weight may be threadedly connected to a cap which is attached to the pin for connecting the lateral control rod thereto.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
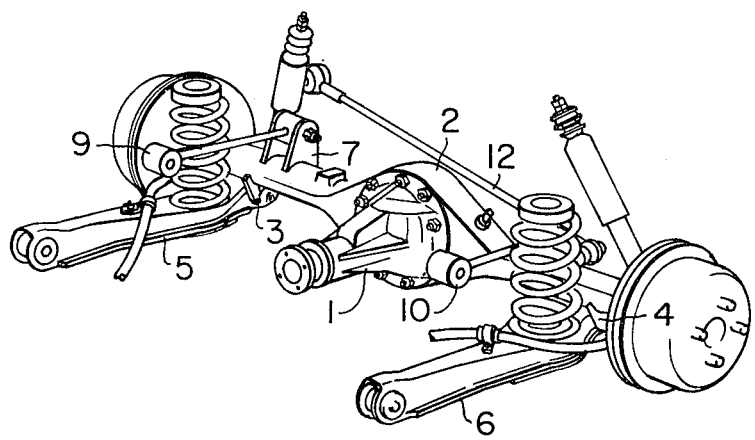
FIG. 1 is a prospective view illustrating a portion of the rear axle assembly of the vehicle at which the present invention is applied.

Referring now to the drawings, wherein like reference numerals are utilized to indicate similar parts throughout the various figures thereof, and more particularly to FIG. 1, the 4-link rear suspension type to which the present invention is applied includes a rear axle housing 2 containing the rear axle shafts (not shown) located within a differential carrier 1. In a lower portion of the housing 2 on both outer sides thereof there are mounted lower control arms 5 and 6, at one end thereof, with lower arm brackets 3 and 4 being provided. In an upper portion of the housing 2 on both inner sides thereof there are mounted upper control arms 9 and 10 each including at one end thereof respectively, upper arm brackets 7 and 8. Behind the brackets 4 and 8 both located on one side of the housing 2 there is mounted one end of a lateral control rod 12 by means of a lateral bracket 11. The opposite ends of the arm 5, 6, 9 and 10 and of the rod 12 are connected to the body-frame attachments of the vehicle (not shown).

As a result vibration excited by the rear axle pinion and ring gears is transmitted to the body of the vehicle after it is amplified by the rear axle housing thereby developing noise within the passenger compartment of the vehicle.

Figure 2:
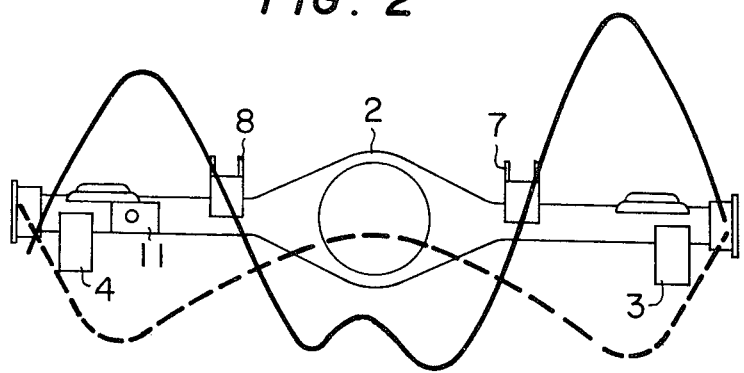
FIG. 2 is a graphic illustration depicting the mode shapes of the rear axle housing.

In examining the vibration mode in the longitudinal direction of the rear axle housing 2 it has been found that the verticle bending mode and the torsional mode are such as is depicted by the solid line and the broken line, respectively, set forth in FIG. 2. Under such conditions, the noise within the passenger enclosure of the vehicle is highest at a vehicle speed of about 100 kilometers per hour or a second harmonic gear mesh frequency (rpm of the drive shaft × the number of teeth of the drive pinion of the differential gear × 2) of about 1,000 Hz. For this reason, until the present time attention has been directed to such a vibration mode of the rear axle housing 2 and noise reduction attempts have involved expedients such as changing the resonant frequency or reducing the vibration level.

In the development of the present invention, consideration is directed to the fact that the vertical bending vibration level and the torsional vibration level are highest at the neighborhood of the lateral bracket 11 in this vibration mode. Furthermore, the vibration mode of the mounting portion of the lateral control rod 12 becomes pertinent in this context.

The bracket 11 includes a pin 17 supporting the lateral control rod 12 at one end by means of a retainer, with a rubber bushing 14 being provided for absorbing shock and with a nut 16 having a cotter 15 being arranged to hold the rod 12 in place. It has been found that the vertical vibration mode of the lateral bracket 11 is such as shown by the solid line of FIG. 3. This vibration mode is synthesized with bending and torsional vibration components, and with its own elastic vibration component and at the initial condition the node appears in the rear axle housing 2 and a loop occurs in the vicinity of pin 17. It has been found that the higher vibration level developed in the vicinity of the pin 17 is the greatest factor to generate noise within the passenger compartment of the vehicle.

Figure 4A:
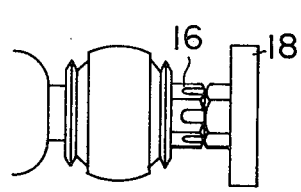
FIGS. 4a–c are side views showing three embodiments of the present invention.
Figure 4B:
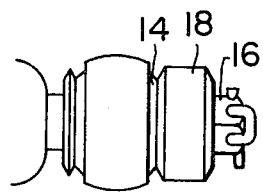
Figure 4C:
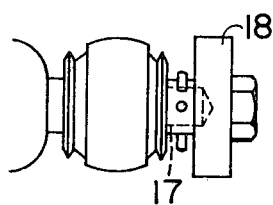

The present invention is directed toward varying the vibration mode of the lateral bracket 11 and of the pin 17 without damping. The basic concept of the invention involves the mounting of a weight 18, which may preferably be within a several hundred of grams, at or in the vicinity of the connection between the lateral rod 12 and the pin 17. The weight 18 may be welded directly to the nut 16, as shown in FIG. 4a. Alternatively, the weight 18 may be placed between the rubber bushing 14 and the nut 16 as shown in FIG. 4b. Furthermore, as shown in FIG. 4c, the weight may be threadedly attached directly upon a cap of the pin 17.

Figure 3:
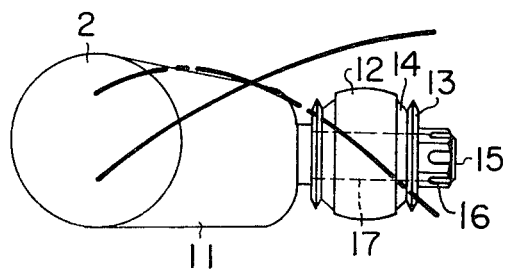
FIG. 3 is a schematic illustration depicting the vertical mode shapes of a lateral bracket and pin on the housing.

As a result of utilization of the weight 18 of the present invention, the pin 17 is adapted to derive a new source of vibration and as a result of interference by both the weight 18 and the rear axle housing 2, the vibration mode of the lateral bracket 11 and the pin 17 takes on a form which is depicted by the broken line of FIG. 3.

It will be noted that, as shown in FIG. 3, the node occurs in the pin 17 and the vibration level reduces, thereby decreasing the vibration transmitted from the lateral control rod to the body of the vehicle.

Figure 5:
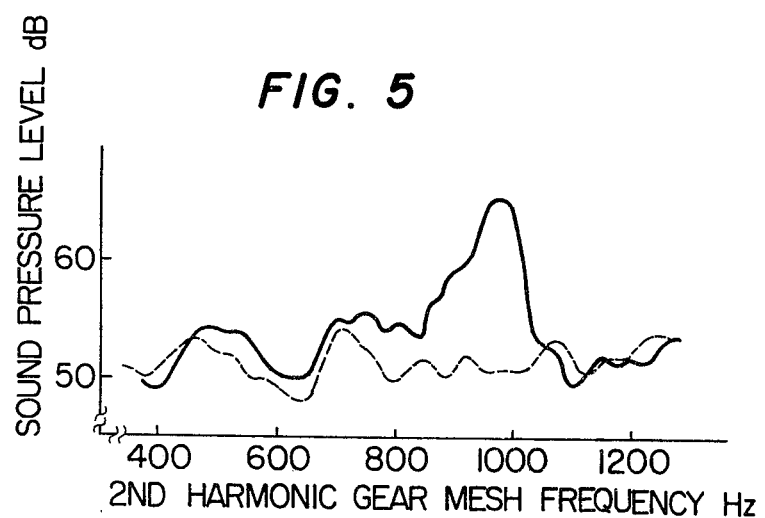
FIG. 5 is a graphical diagram showing the relationship between the front seat sound pressure level and the second harmonic gear mesh frequency.

In view of the result thus achieved, the effect developed according to the present invention may be examined by measuring the sound pressure level at the front seat of the vehicle. The result of such measurement is shown in FIG. 5 wherein data obtained from prior art sources are shown in solid line form with the data obtained from the present invention being shown in broken line. Noise is highest at the second harmonic gear mesh frequency in the neighborhood of 1000 Hz, then the axle noise level at about 1000 Hz decreases to a level equivalent to or less than levels occurring at other frequencies during operation of the vehicle.

As described in the foregoing, according to the present invention, the vibration level of the pin 17 mounting the lateral control rod 12 on the rear axle housing 2 is reduced and as a result noise generated in the vehicle passenger compartment is effectively reduced. The vibration level of the pin 17 is reduced by changing the vibration mode of the pin and of the lateral bracket 11.

Accordingly, it will be seen that the present invention provides a device which is quite simple in construction as compared with other devices in which damping is effected by a dynamic damper, with the noise reduction device of the present invention being easily mounted on existing parts to effectively reduce noise levels without introducing undue structural complexity.

While specific embodiments of the invention have been shown and described in detail to illustrate the application of the inventive principles, it will be understood that the invention may be embodied otherwise without departing from such principles.

What is claimed is:

1. In a noise reduction device for an automotive vehicle having a body-frame, a rear axle housing with a differential carrier, a mounting pin extending from said housing and a lateral control rod connected between said body-frame and said pin, the improvement wherein said noise reduction device comprises a weight fixedly mounted at the connection point between said lateral control rod and said pin.

2. The device according to claim 1 wherein said weight is between about 120–200 grams.

3. The device according to claim 1 wherein said rod is attached to said pin by means of a nut and wherein said weight is welded directly upon said nut.

4. The device according to claim 1 wherein the means connecting said rod to said pin include a rubber bushing and a nut, and wherein said weight is mounted between said rubber bushing and said nut.

5. The device according to claim 1 including a cap for mounting said rod to said pin wherein said weight is threadedly connected to said cap.

* * * * *